United States Patent
Nunan et al.

(10) Patent No.: US 8,968,690 B2
(45) Date of Patent: *Mar. 3, 2015

(54) THREE-WAY CATALYST HAVING AN UPSTREAM SINGLE-LAYER CATALYST

(75) Inventors: John G. Nunan, Tulsa, OK (US); Raoul Klingmann, Alzenau (DE); Ryan J. Andersen, Owasso, OK (US); Davion Onuga Clark, Bad Soden (DE); David Henry Moser, Sterling Heights, MI (US)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/988,706
(22) PCT Filed: Nov. 21, 2011
(86) PCT No.: PCT/EP2011/070539
§ 371 (c)(1),
(2), (4) Date: Jul. 16, 2013
(87) PCT Pub. No.: WO2012/069404
PCT Pub. Date: May 31, 2012

(65) Prior Publication Data
US 2013/0287660 A1 Oct. 31, 2013

Related U.S. Application Data

(63) Continuation of application No. 12/951,301, filed on Nov. 22, 2010, now Pat. No. 8,557,204.

(51) Int. Cl.
*B01D 53/56* (2006.01)
*B01D 53/94* (2006.01)
(Continued)

(52) U.S. Cl.
CPC .............. *B01J 23/42* (2013.01); *B01D 53/945* (2013.01); *B01D 53/9472* (2013.01);
(Continued)

(58) Field of Classification Search
CPC ...... B01J 23/44; B01J 23/464; B01D 53/944; B01D 53/945
USPC .............. 502/326, 327, 332–334, 339, 439, 502/527.12, 527.13; 423/213.5; 422/177, 422/180
See application file for complete search history.

(56) References Cited

U.S. PATENT DOCUMENTS

| 5,179,059 A | 1/1993 | Domesle et al. |
| 5,593,647 A | 1/1997 | Kirby |

(Continued)

FOREIGN PATENT DOCUMENTS

| DE | 196 17 124 A1 | 10/1996 |
| EP | 0 441 173 A1 | 8/1991 |

(Continued)

OTHER PUBLICATIONS

International Search Report for Application No. PCT/EP2011/070539 dated Mar. 2, 2012.

(Continued)

*Primary Examiner* — Cam N. Nguyen
(74) *Attorney, Agent, or Firm* — Smith, Gambrell & Russell LLP (57) ABSTRACT

Disclosed herein is a layered three-way catalytic system being separated in a front and a rear portion having the capability of simultaneously catalyzing the oxidation of hydrocarbons and carbon monoxide and the reduction of nitrogen oxides. Provided is a catalyst composite comprising a single front catalytic layer and two rear catalytic layers in conjunction with a substrate, where the single font layer and the rear bottom layer comprise a Pd component, the rear top layer comprises a Rh component, and the rear bottom layer is substantially free of an oxygen storage component (OSC).

15 Claims, 2 Drawing Sheets

(51) Int. Cl.
*B01D 50/00* (2006.01)
*B01D 53/34* (2006.01)
*B01J 8/02* (2006.01)
*C01B 21/00* (2006.01)
*C01B 23/00* (2006.01)
*C01B 25/00* (2006.01)
*C01B 31/00* (2006.01)
*C01B 33/00* (2006.01)
*C01B 35/00* (2006.01)
*C01G 28/00* (2006.01)
*C01G 30/00* (2006.01)
*B01J 23/02* (2006.01)
*B01J 23/40* (2006.01)
*B01J 23/42* (2006.01)
*B01J 23/44* (2006.01)
*B01J 23/56* (2006.01)
*B01J 21/04* (2006.01)
*B01J 23/46* (2006.01)
*B01J 23/63* (2006.01)
*B01J 35/00* (2006.01)
*B01J 37/02* (2006.01)
*B01J 23/10* (2006.01)
*B01J 35/04* (2006.01)
*B01J 35/10* (2006.01)
*B01J 23/62* (2006.01)

(52) U.S. Cl.
CPC .......... *B01D 53/9477* (2013.01); *B01J 23/464* (2013.01); *B01J 23/63* (2013.01); *B01J 35/0006* (2013.01); *B01D 53/94* (2013.01); *B01J 37/0244* (2013.01); *B01J 37/0246* (2013.01); *B01J 21/04* (2013.01); *B01J 23/10* (2013.01); *B01J 35/04* (2013.01); *B01J 35/1014* (2013.01); *B01J 35/1019* (2013.01); B01D 2255/1023 (2013.01); B01D 2255/1025 (2013.01); B01D 2255/9022 (2013.01); B01D 2255/908 (2013.01); B01D 2258/014 (2013.01); Y02T 10/22 (2013.01); *B01J 23/62* (2013.01); *B01J 35/004* (2013.01); Y10S 502/52712 (2013.01); Y10S 502/52713 (2013.01)
USPC ........ 423/213.5; 502/326; 502/327; 502/332; 502/333; 502/339; 502/439; 502/527.12; 502/527.13; 422/177; 422/180

(56) References Cited

U.S. PATENT DOCUMENTS

| | | | |
|---|---|---|---|
| 5,672,557 A | 9/1997 | Williamson et al. | |
| 5,772,972 A | 6/1998 | Hepburn et al. | |
| 5,795,840 A | 8/1998 | Takami et al. | |
| 5,981,427 A | 11/1999 | Sung et al. | |
| 6,080,375 A * | 6/2000 | Mussmann et al. | 423/213.5 |
| 6,087,298 A | 7/2000 | Sung et al. | |
| 6,375,910 B1 | 4/2002 | Deeba et al. | |
| 6,387,338 B1 | 5/2002 | Anatoly et al. | |
| 6,395,675 B1 | 5/2002 | Suga et al. | |
| 6,478,874 B1 | 11/2002 | Rosynsky et al. | |
| 6,497,851 B1 | 12/2002 | Hu et al. | |
| 6,585,944 B1 | 7/2003 | Nunan et al. | |
| 7,022,646 B2 | 4/2006 | Li | |
| 7,041,622 B2 | 5/2006 | Nunan | |
| 7,084,086 B2 | 8/2006 | Kashahara et al. | |
| 7,189,376 B2 | 3/2007 | Kimar et al. | |
| 7,329,629 B2 | 2/2008 | Gandhi et al. | |
| 7,374,729 B2 | 5/2008 | Chen et al. | |
| 7,442,346 B2 | 10/2008 | Ikeda et al. | |
| 7,446,076 B2 | 11/2008 | Miyoshi et al. | |
| 7,473,665 B2 | 1/2009 | Kawai et al. | |
| 7,501,098 B2 | 3/2009 | Chen et al. | |
| 7,517,510 B2 | 4/2009 | Chen et al. | |
| 7,524,465 B2 | 4/2009 | Kumar et al. | |
| 7,550,124 B2 | 6/2009 | Chen et al. | |
| 7,576,031 B2 * | 8/2009 | Beutel et al. | 502/339 |
| 7,622,096 B2 * | 11/2009 | Deeba et al. | 423/213.2 |
| 7,638,460 B2 | 12/2009 | Nakamura et al. | |
| 7,678,347 B2 | 3/2010 | Chen | |
| 7,709,414 B2 * | 5/2010 | Fujdala et al. | 502/326 |
| 7,718,150 B2 | 5/2010 | Theis et al. | |
| 7,722,829 B2 * | 5/2010 | Punke et al. | 422/180 |
| 7,737,077 B2 | 6/2010 | Kitamura et al. | |
| 7,745,367 B2 * | 6/2010 | Fujdala et al. | 502/60 |
| 7,749,472 B2 | 7/2010 | Chen et al. | |
| 7,754,171 B2 | 7/2010 | Chen et al. | |
| 7,758,834 B2 | 7/2010 | Chen et al. | |
| 7,759,283 B2 | 7/2010 | Yamato et al. | |
| 7,765,802 B2 | 8/2010 | Bruck | |
| 7,785,545 B2 | 8/2010 | Miyoshi et al. | |
| 7,875,250 B2 | 1/2011 | Nunan | |
| 7,875,573 B2 * | 1/2011 | Beutel et al. | 502/339 |
| 7,922,988 B2 * | 4/2011 | Deeba et al. | 423/213.2 |
| 7,947,238 B2 | 5/2011 | Deeba | |
| 7,947,248 B2 * | 5/2011 | Hamby et al. | 423/449.1 |
| 8,007,750 B2 | 8/2011 | Chen et al. | |
| 8,057,745 B2 | 11/2011 | Toyoda et al. | |
| 8,066,963 B2 | 11/2011 | Klingmann et al. | |
| 8,211,392 B2 | 7/2012 | Grubert et al. | |
| 8,220,251 B2 | 7/2012 | Oger et al. | |
| 8,227,374 B2 | 7/2012 | Sato et al. | |
| 8,246,923 B2 | 8/2012 | Southward et al. | |
| 8,258,070 B2 | 9/2012 | Fujdala et al. | |
| 8,637,426 B2 * | 1/2014 | Hoke et al. | 502/339 |
| 2005/0227867 A1 * | 10/2005 | Chen et al. | 502/325 |
| 2006/0228274 A1 | 10/2006 | Okada | |
| 2007/0137187 A1 * | 6/2007 | Kumar | 60/299 |
| 2009/0041643 A1 * | 2/2009 | Deeba et al. | 423/213.5 |
| 2009/0175773 A1 * | 7/2009 | Chen et al. | 423/213.5 |
| 2009/0288402 A1 * | 11/2009 | Voss et al. | 60/299 |
| 2010/0104491 A1 | 4/2010 | Deeba | |
| 2010/0124519 A1 * | 5/2010 | Kohli | 422/169 |
| 2010/0126154 A1 | 5/2010 | Klingmann et al. | |
| 2010/0183490 A1 * | 7/2010 | Hoke et al. | 423/213.5 |
| 2010/0212293 A1 * | 8/2010 | Deeba et al. | 60/274 |
| 2011/0123421 A1 * | 5/2011 | Grubert | 423/212 |

FOREIGN PATENT DOCUMENTS

| | | |
|---|---|---|
| EP | 0 941 757 A2 | 9/1999 |
| EP | 1 541 220 A1 | 6/2005 |
| EP | 1 669 135 A1 | 6/2006 |
| EP | 1 712 279 | 10/2006 |
| EP | 1 900 416 A2 | 3/2008 |
| EP | 1 974 810 A1 | 10/2008 |
| EP | 2 042 226 A2 | 4/2009 |
| EP | 2 072 121 | 6/2009 |
| JP | 7-124467 A | 5/1995 |
| JP | 7-124468 A | 5/1995 |
| JP | 2002-45702 A | 2/2002 |
| JP | 2009-19537 A | 1/2009 |
| WO | 95/35152 A1 | 12/1995 |
| WO | 2008/097702 A | 8/2008 |
| WO | 2009/012348 A1 | 1/2009 |
| WO | 2010/001226 A1 | 1/2010 |

OTHER PUBLICATIONS

International Search Report & Written Opinion PCT/EP2011/070541 mailed Feb. 17, 2012.

Silver R., et al.: SAE 972843 "A Durable In-Line Hydrocarbon Absorber for Reduced Cold Start Exhaust Emissions", published Oct. 1, 1997.

* cited by examiner

THREE-WAY CATALYST HAVING AN UPSTREAM SINGLE-LAYER CATALYST

TECHNICAL FIELD

This invention pertains generally to layered catalysts used to treat gaseous streams containing hydrocarbons, carbon monoxide, and oxides of nitrogen. More specifically, this invention is directed to three-way-conversion (TWC) catalysts having an upstream single-layer catalyst and a downstream multi-layer catalyst.

BACKGROUND AND PRIOR ART

Current TWC catalysts are used for mobile emission control from Otto engines. The technology is well developed with emission reduction capabilities of >99% for CO, HC (hydrocarbons) and NOx (nitrogen oxides) after heat up to operating temperatures of greater than 250° C. Typical TWC catalyst configurations consist of single brick or multi-brick systems in the exhaust line of the vehicle. If more than one catalyst is used, the catalysts can be located in a single converter, butted together, or separated by a defined space as in separate converters. A common design for large and cooler engines is to have one converter in a hot close coupled (CC) position (close to the manifold) with the second converter in the cooler underbody (UB) location. Since nearly all mobile emission control systems are passive in nature, time to heat up to the catalyst operating temperature is critical as disclosed in EP1900416, which is relied on and herein incorporated by reference in its entirety.

Thus, CC catalyst designs often consist of features that favor rapid heat up such as light, small size substrates (low thermal inertia), high cell density (improved mass & heat transfer) and high platinum group metal (PGM; e.g., platinum, palladium, rhodium, rhenium, ruthenium and iridium) loading. On the other hand the UB catalyst can be of larger volume and lower cell density (lower pressure drop) and more often contains lower PGM loading. For smaller vehicles that operate at high RPM only one converter is typically used, often located in the CC position. A disadvantage of locating catalysts close to the manifold is increased thermal degradation, and more rapid loss of activity, especially under high load/high speed conditions which results in loss of support surface area or pore volume and rapid sintering of the PGM.

Modern TWC catalysts use a variety of strategies to limit or slow thermal degradation such as high surface area stable alumina supports for the PGMs, the addition of promoters and stabilizers and advanced oxygen storage components (OSCs) that both improve performance and degrade at a slower rate (see e.g. U.S. Pat. No. 5,672,557, which is relied on and herein incorporated by reference in its entirety).

In the art, certain design strategies have been used to balance performance with associated costs. These strategies include selection of PGM type and distribution, substrate volume, cell density, WC layering, and composition of the various WC layers.

An important design feature for TWC technologies consists of appropriate separation and configuration of both the PGM and washcoat (WC) components either in separate WC layers and/or in separate bricks if multi-brick systems are used. Most modern TWC catalysts can have one to more WC layers, the most common being 2-layer systems. See e.g., EP1541220, US5981427, WO09012348, WO08097702, WO9535152, US7022646, US5593647, which are relied on and herein incorporated by reference in their entirety.

For the PGMs, the most common strategy is to locate the Rh and optionally the Pt component in the top or $2^{nd}$ WC layer with Pd preferably located in the bottom or $1^{st}$ WC layer (see e.g., U.S. Pat. No. 5,593,647). Separation of both the WC components and PGMs can also be achieved for single bricks by zoning whereby the front or rear zone or section of a WC layer can consist of different support components or different PGM components or more commonly different concentrations of a given PGM such as Pd. One advantage for separation of the PGMs in layers or zones is that more optimum supports and promoters for each PGM can be used so as to maximize overall performance.

Prior to the present invention, researchers have been drawn to certain WC composition configurations that are taught as representing the preferred configuration for best performance. Thus, for two-layer UB catalysts Rh is invariably located in the top ($2^{nd}$) layer with optionally Pt also present while Pd is located in the $1^{st}$ or bottom layer (see e.g., U.S. Pat. No. 5,593,647). Further, both the top ($2^{nd}$) and bottom ($1^{st}$) layers ideally contain a high surface area refraction oxide support such as a gamma or gamma/theta/delta alumina with further addition of promoters, stabilizers and a suitable oxygen storage component (OSC). This WC design is described in detail by Sung et al. (U.S. Pat. No. 6,087,298) and Hu et al. (U.S. Pat. No. 6,497,851) hereby included for reference purposes. Both Sung et al. and Hu et al. also describe preferred WC compositions and configurations for the CC catalysts or zones at the inlets to the exhaust gas flow. Thus, for the inlet CC or inlet (front) zone the WC design is preferably free of an OSC and consists of a high surface area refractory oxide support such as a gamma or theta/delta alumina with appropriate stabilizers and additives. On the other hand, it is preferred that the rear catalyst, zone or UB catalyst, have an OSC present in the bottom and top layers. These and other features are described for example by Hu et al. and references quoted therein.

Within the TWC catalyst field new technologies and WC configurations and systems are required to meet the ever more stringent emission standards and the need to slow catalyst deactivation and achieve ever increasing performance at low PGM loadings.

SUMMARY OF THE INVENTION

This invention relates to TWC catalysts having different WC compositions with respect to their locations relative to each other and their use in emission control systems. Specifically, the TWC catalysts according to the present invention comprise at least a front (upstream) brick or zone and a rear (downstream) brick or zone. The rear brick or zone comprises at least two layers, wherein an OSC is absent in the $1^{st}$ (lower) catalytic layer. In some embodiments, one or more bricks or zones may be placed between the front and rear bricks or zones. In some embodiments, the zones or bricks are located in a single converter, butted together or separated by a defined space. In some embodiments, the bricks are located in separate converters. In some embodiments, two or more separate converters are provided and at least one converter contains a rear zone or brick with at least two layers and the absence of OSC in the $1^{st}$ catalytic layer. In some embodiments which comprise more than one separate converter, the furthest downstream converter contains a rear zone or brick with at least two layers and the absence of OSC in the $1^{st}$ catalytic layer.

In some embodiments, the invention is directed to a catalyst composite for the purification of exhaust gases of a combustion engine substantially running under stoichiometric conditions comprising in sequence and in order:
- a front single catalytic layer on a substrate; and
- a rear double layer on a substrate having a $1^{st}$ (lower) catalytic layer and a $2^{nd}$ (upper) catalytic layer;
- wherein the $2^{nd}$ catalytic layer comprise a platinum group metal compound (PGM), such as rhodium; and
- wherein the front single catalytic layer and the $1^{st}$ catalytic layer comprise another platinum group metal compound (PGM), such as palladium; and
- wherein the $1^{st}$ catalytic layer is substantially free of an oxygen storage component (OSC).

By reference to $1^{st}$ and $2^{nd}$ catalytic layers, no limitation is being placed on the location of the layer in view of the direction of exhaust flow. Locations of the layers in view of the exhaust flow are rather described by front (upstream) and rear (downstream) layers. A $1^{st}$ catalytic layer is deposited on a substrate or a bottom layer already deposited on a substrate to form a lower coating. A $2^{nd}$ catalytic layer is deposited on and having physical contact with the $1^{st}$ catalytic layer to form the upper coating.

In other words, the front (upstream) zone or brick that comes into contact with the exhaust first is closest to the engine. The rear (downstream) zone or brick is one that comes into contact with the exhaust after contact with a prior zone or brick. The rear zone or brick can have a bottom ($1^{st}$) catalytic layer and a top ($2^{nd}$) catalytic layer. The front and rear zones or bricks can be in the same converter and can be touching each other or be separated by a distance, e.g. about an inch or so. Alternatively, the front and rear zones or bricks can be in separate converters which may be separated by a large distance, e.g. about 1-6 feet.

The term "substantially free of an oxygen storage component (OSC)" refers to having a very low amount or, preferably, no OSC in, for example, a given layer. A very low amount of OSC is understood to mean less than or equal to about 1%, preferably about 0.5%, more preferably about 0.25%, and most preferably about 0.1% by weight of OSC in a given layer.

In some embodiments, an exhaust treatment system comprising the catalyst composite is provided. The exhaust treatment system may further comprise one or more exhaust treatment devices selected from the group consisting of gasoline particulate filter traps (GPT), HC trap and NOx adsorber catalysts.

In some embodiments, the present invention provides methods for treating exhaust gases which comprises contacting a gaseous stream comprising hydrocarbons, carbon monoxide, and nitrogen oxides with a layered catalyst composite or an exhaust treatment system as described herein, wherein the catalytic material employed is effective to substantially simultaneously oxidize the carbon monoxide and the hydrocarbons and reduce the nitrogen oxides. In some embodiments, the exhaust gas temperature at the catalyst inlet can vary from room temperature to as high as 1100° C., however typical catalyst operating temperatures by design fall in the range of about 300-900° C.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

BRIEF DESCRIPTION OF THE DRAWINGS

The present invention will be further understood with reference to the drawings wherein.

DETAILED DESCRIPTION OF THE INVENTION

The present invention is directed to a three-way conversion (TWC) catalyst and the compositions and locations of the catalytic layers relative to the direction of exhaust gas flow. In particular, the TWC catalysts according to the present invention comprise at least a front (upstream) brick or zone and a rear (downstream) brick or zone, wherein the rear brick or zone comprises at least two layers, wherein an OSC is absent in the $1^{st}$ (lower) catalytic layer. As disclosed herein, TWC catalysts according to the present invention provide large performance benefits that are unexpected based on the teachings and best practices in the art prior to the instant invention.

The present invention relates to a layered catalyst composite of the type generally referred to as a three-way conversion (TWC) catalyst having the capability to simultaneously catalyze the oxidation of hydrocarbons and carbon monoxide and the reduction of nitrogen oxides. The catalyst composite is divided into at least two sections either by using different zones on one substrate or using separate bricks being located in a single converter, butted together, or separated by a defined space as in separate converters.

In some embodiments, the platinum group metal (PGM) loading of the catalytic layers is about 0.001-20.0% by weight. In some embodiments, each layer of the catalytic layers may comprise a different composition. In some embodiments, each layer has a loading of from about 0.2-2.8 g/in$^3$. In some embodiments, each layer has a PGM loading of from about 0.01% by weight to about 20.0% by weight of the layer. In some embodiments, each of the respective layers is deposited at a PGM loading of about 0.02-15.0% by weight.

In some embodiments, the catalyst composite refers to a PGM content of the layers which are as follows:
- Single front catalytic layer—0.01-about 12.0% by weight of the layer;
- $1^{st}$ catalytic layer—0.1-about 6.0% by weight of the layer;
- $2^{nd}$ catalytic layer—0.01-about 2.0% by weight of the layer.

The $2^{nd}$ catalytic layer always comprises rhodium as a PGM but may also comprise other PGMs as well. Rh is preferred in the $2^{nd}$ catalytic layer as NOx reduction based on the $2CO+2NO \rightarrow N_2+2CO_2$ reaction is most efficient at intermediate temperatures in the range of 300-600° C. In some embodiments, the amount of rhodium in a layer is about 0.01-1.0% by weight, preferably 0.02-0.5%, and most preferably 0.05-0.25% by weight.

The single front and the $1^{st}$ catalytic layer always comprise palladium as a PGM but may also comprise other PGMs as well. In a preferred embodiment, the single front layer and the $1^{st}$ catalytic layer only comprises palladium as a PGM. Palladium is particularly effective for HC oxidation and is often concentrated in the lead or front brick so as to initiate HC light-off as soon as possible. This arises as the concentration of HC emitted from the engine is greater in the initial stages of vehicle operation in contrast to NOx which is emitted largely after warm-up of the vehicle. In some embodiments, the amount of palladium in this layer is about 0.1-15.0% by weight, preferably about 0.2-10.0%, and most preferably about 0.5-5.0% by weight.

As already indicated it may be advantageous to have Pt as a PGM present in the layers, especially the $2^{nd}$ catalytic layer. Pt has the advantage of being particularly effective for hard HC (saturated HCs) oxidation and may advantageously form alloys with Rh. Under normal stoichiometric/rich/lean exhaust gas conditions the surface of the alloy is rich in Rh which protects this PGM from negative interactions with the support. In some embodiments, an amount of platinum group metal is up to about 4% by weight of the layer.

In some embodiments, the amount of platinum in a layer is about 0.05-5% by weight, preferably about 0.1-2.0%, and most preferably about 0.3-1.0% by weight. In some embodiments, the platinum content of the layers is as follows:
  single front catalytic layer—about 0.05-5.0% by weight of the layer, preferably about 0.1-2.0%, and most preferably about 0.3-1.0%;
  $2^{nd}$ catalytic layer—about 0.025-2.5% by weight of the layer, preferably about 0.1-2.0%, and most preferably about 0.3-1.0%.

Reference to OSC (oxygen storage component) refers to an entity that has multi-valence state and can actively react with oxidants such as oxygen or nitrogen oxides under oxidative conditions, or reacts with reductants such as carbon monoxide (CO), hydrocarbons (HCs) or hydrogen under reduction conditions. Suitable oxygen storage components may include one or more oxides of one or more rare earth or transition metals selected from the group consisting of cerium, zirconium, terbium, iron, copper, manganese, cobalt, praseodymium, lanthanum, yttrium, samarium, gadolinium, dysprosium, ytterbium, niobium, neodymium, and mixtures of two or more thereof. Examples of suitable oxygen storage components include ceria, praseodymia, or combinations thereof.

Delivery of an OSC to the layer can be achieved by the use of, for example, mixed oxides. For example, ceria can be delivered by a mixed oxide of cerium and zirconium, and/or a mixed oxide of cerium, zirconium and neodymium with optionally other rare earths such as lanthanum or yttrium also present. For example, praseodymia may be delivered by a mixed oxide of praseodymium and zirconium, and/or a mixed oxide of praseodymium, cerium, lanthanum, yttrium, zirconium, and neodymium. Suitable compositions can be found in U.S. Pat. No. 6,387,338 and U.S. Pat. No. 6,585,944, both of which are herein incorporated by reference in their entirety.

The OSC can be present up to about 80% by weight of the layer, preferably about 20-70%, and most preferably about 30-60%. The ceria or praseodymia content in the range of about 3-98%, preferably about 10-60%, most preferably about 20-40% by weight of OSC. Suitable oxygen storage components may include one or more oxides of one or more rare earth or transition metals selected from the group consisting of cerium, zirconium, terbium, iron, copper, manganese, cobalt, praseodymium, lanthanum, yttrium, samarium, gadolinium, dysprosium, ytterbium, niobium, neodymium, and mixtures of two or more thereof.

In some embodiments, the catalyst composite according to the invention comprises a content of oxygen storage component (OSC) by weight of the layer as follows:
  Single front catalytic layer—about 10-80% by weight of the layer, preferably about 20-70%, and most preferably about 30-60%;
  $2^{nd}$ catalytic layer—about 10-80% by weight of the layer, preferably about 20-70%, and most preferably about 30-60%.

In some embodiments, the catalyst composite further comprises exhaust treatment materials selected from the group consisting of hydrocarbon storage components, NOx storage components as the current design may have particular applicability for exhaust treatment systems comprising HC traps and/or NOx adsorber functionalities. Current state-of-the-art catalyzed HC trap designs utilize an undercoat (UC—see later) consisting of HC trapping materials inclusive of various zeolites with a TWC overcoat (OC) of one or two layers as described in Japanese patents JP7124468 and JP7124467 and U.S. Pat. No. 7,442,346, which are herein incorporated by reference. Optimum performance is achieved for designs whereby the $1^{st}$ catalytic layer does not contain OSC and where the $2^{nd}$ catalytic layer does contain an OSC as described in the current invention for optimum configuration of the WC composition in $1^{st}$ and $2^{nd}$ catalytic layers of the front and rear technology. Further, the newest design for HC trap location is in the cooler rear or underbody (UB) location (U.S. Pat. No. 7,442,346) as distinct from earlier strategies of placing the HC trap in the CC position (U.S. Pat. No. 5,772,972; Silver R. G., Dou D., Kirby C. W., Richmond R. P., Balland J., and Dunne S.; SAE 972843 and references therein) again in line with the current configuration of WC layers. For the case of NOx adsorber catalysts, a preferred location of the adsorber is again in the cooler UB location with an active TWC also present to both generate $H_2$ and to complete HC/CO combustion during the rich/lean transients.

A suitable support according to some embodiments of the present invention is a refractory oxide support. Reference to a "support" in a catalyst layer refers to a material onto or into which platinum group metals, stabilizers, promoters, binders or other additives and the like are dispersed or impregnated, respectively. A support can be activated and/or stabilized as desired. Examples of supports include, but are not limited to, high surface area refractory metal oxides, composites containing oxygen storage components, and molecular sieves as is well known in the art. In some embodiments, the support of each layer independently comprises a compound that is activated, stabilized, or both selected from the group consisting of, but not limited to, alumina, silica, silica-alumina, alumino-silicates, alumina-zirconia, lanthana-alumina, lanthana-zirconia-alumina, baria-alumina, baria lanthana-alumina, alumina-chromia, and alumina-ceria. The support may comprise any suitable material, for example, a metal oxide comprising gamma-alumina or promoter-stabilized gamma-alumina having a specific surface area of about 50-350 $m^2/g$, preferably about 75-250 $m^2/g$, and most preferably about 100-200 $m^2/g$. In some embodiments, the alumina present in any of the layers comprises, optionally zirconia- and lanthana-stabilized (gamma-) alumina in a loading of about 5-90% by weight of the layer, preferably about 20-70%, and most preferably about 30-60%. For example, a suitable stabilized alumina may comprise about 0.1-15% by weight of lanthana (preferably as a stabilizer), preferably about 0.5-10%, and most preferably about 1-7%; and/or about 0.5-15%, preferably about 0, 5-10%, and most preferably about 1-7% zirconia (preferably as a stabilizer in gamma-alumina). In some embodiments, the alumina comprises gamma-alumina stabilized by barium oxide, neodymia, lanthana and combinations thereof. The stabilizer loading on a suitable alumina is about 0-4% by weight of support, preferably about 1-3%, and most preferably about 2% barium oxide. It is noted that lanthana, zirconia and neodymia are stabilizers and that, in some embodiments, one or more can be at the same loading range, i.e. lanthana, zirconia, neodymia, or a combination thereof can be present at 0.1-15% by weight.

In some embodiments, a molecular sieve material can be selected from the group consisting of faujasite, chabazite, silicalite, zeolite X, zeolite Y, ultrastable zeolite Y, offretite, Beta, ferrierite and ZSM/MFI zeolites. In particular, ion-exchanged Beta zeolites may be used, such as Fe/Beta zeolite, or preferably, H/Beta zeolite. The zeolites, preferably Beta zeolites may have a silica/alumina molar ratio of from at least about 25/1 or at least about 50/1, with useful ranges of from about 25/1 to 1000/1, 50/1 to 500/1 as well as about 25/1 to 300/1, for example.

In some embodiments, the layers provided are the single front and/or $1^{st}$ catalytic layer comprising a stabilized alumina, such as gamma-alumina, which can be present in an amount in the range of about 10-90% by weight of the layer, preferably about 20-70%, and most preferably about 30-60%, substantially only palladium, which can be present in an amount in the range of about 0.1-10.0% by weight of the layer, preferably about 0.1-5.0%, and most preferably about 0.2-2.0%.

In some embodiments, the $2^{nd}$ catalytic layer comprises a stabilized alumina, such as lanthana stabilized gamma-alumina, which can be present in an amount in the range of about 10-90% by weight of the layer, preferably about 20-70%, and most preferably about 30-60%; rhodium, which can be present in an amount in the range of about 0.01-1.0% by weight of the layer, preferably about 0.05-0.5%, and most preferably about 0.1-0.25%.

In some embodiments, the $2^{nd}$ catalytic layer comprises a stabilized alumina, such as gamma-alumina, which can be present in an amount in the range of about 10-90% by weight of the layer, preferably about 20-70%, and most preferably about 30-60%, platinum, which can be present in an amount in the range of up to about 4.0% by weight of the layer, preferably about 0.1-2.0%, and most preferably about 0.05-1.0%, whereby rhodium, which can be present in an amount in the range of about 0.01-1.0% by weight of the layer, preferably about 0.05-0.5%, and most preferably about 0.1-0.25%.

In some embodiments, it may be desirable that a given layer further comprises up to about 40%, preferably about 5-30%, and most preferably about 10-20% of a stabilizer comprising one or more non-reducible metal oxides wherein the metal is selected from the group consisting of barium, calcium, magnesium, strontium, and mixtures thereof. A layer may further comprise, according to one embodiment, 0 to about 40%, preferably about 5-30%, and most preferably about 10-30% of one or more promoters comprising one or more rare earth or transition metals selected from the group consisting of lanthanum, praseodymium, yttrium, zirconium, samarium, gadolinium, dysprosium, ytterbium, niobium, neodymium, and mixtures thereof. A layer may further comprise, according to one embodiment, 0 to about 20%, preferably about 2-20%, and most preferably about 5-10% of one or more binders comprising one or more alumina boehmites, zirconia hydroxites or silica sols, and mixtures thereof. A layer may further comprise, according to one embodiment, 0 to about 20%, preferably about 0-12%, more preferably about 0-6% of one or more of further additives comprising hydrogen sulfide ($H_2S$) control agents such as nickel, iron, zinc, boron, manganese, strontium and mixtures thereof.

Segregated washcoats that address certain catalytic functionalities can be used. The use of at least two layers on a substrate can lead to more efficient use of and/or to a decrease in overall amount of, for example, platinum group metals due to their separation from one another.

In some embodiments, the compositions of each layer are tailored to address a particular function of the TWC catalyst. For example, overcoat layers that are substantially free of platinum group metals and that comprise alumina and one or more base metal oxides are, for example, effective to trap poisons such as sulfur, nitrogen, magnesium, calcium, zinc and phosphorous-containing components. Examples of base metal oxides include, but are not limited to SrO, $La_2O_3$, $Nd_2O_3$, or BaO.

The catalyst composite in its zoned embodiment comprises a substrate comprising an inlet axial end, an outlet axial end, wall elements having a length extending between the inlet axial end to the outlet axial end and a plurality of axially enclosed channels defined by the wall elements; and a front part of the catalyst composite deposited on the wall elements adjacent the inlet axial end and having a length extending less than the wall length of the wall elements, wherein the inlet part of the catalyst composite comprises the single front layer described above. This catalyst composite further comprises a rear part adjacent to the outlet axial end and having a length extending for less than the length of the wall elements, wherein the outlet part of the catalyst composite comprise the $1^{st}$ and $2^{nd}$ catalytic layers described above. For example, the front part of the catalyst composite may comprise (a) a substrate; (b) a single layer deposited on the substrate, the layer comprising palladium deposited on a support; and for example, the rear part of the catalyst composite may comprise (a) a substrate; (b) a $1^{st}$ catalytic layer deposited on the substrate, the $1^{st}$ catalytic layer comprising palladium deposited on a support; (c) a $2^{nd}$ catalytic layer deposited on the $1^{st}$ catalytic layer, the $2^{nd}$ catalytic layer comprising rhodium, and optionally platinum, deposited on a support.

In some embodiments, the front part of the catalyst composite overlaps the rear part of the catalyst composite. In some embodiments, the front part of the catalyst composite comprises between about 10-100%, more preferably about 20-60%, and most preferably about 25-50% of the total length (e.g., 1-15 cm of total length) of the substrate, such as a honeycomb substrate. In some embodiments, the rear part of the catalyst composite comprises between about 10-90%, more preferably about 40-80%, and most preferably about 50-75% of the total length of the substrate, such as a honeycomb substrate.

In some embodiments, one or more catalyst composites of the invention are disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending there through from an inlet or an outlet face of the substrate, such that passages are open to fluid flow there through (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60-900 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a substrate is utilized, the resulting system will be able to remove particulate matter along with gaseous pollutants. The wall-flow filter substrate can be made from materials commonly known in the art, such as cordierite or silicon carbide. In some embodiments, the catalyst composite of the present invention shows a front zone comprising a single front layer deposited on the inlet channels of a wall-flow filter, and the rear zone comprising the $1^{st}$ and $2^{nd}$ catalytic layer is deposited on the outlet channels of a wall-flow filter.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The substrates useful for the catalyst composite of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium, and/or aluminum, and the total amount of these metals may advantageously comprise at least about 15 wt % of the alloy, e.g., about 10-25 wt % of chromium, about 3-8 wt % of aluminum and up to about 20 wt % of nickel. The alloys may also contain small or trace amounts of one or more other metals such as manganese, copper, vanadium, titanium and the like. The surface of the metal substrates may be oxidized at high temperatures, e.g., about 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate. In alternative embodiments, one or more catalyst compositions may be deposited on an open cell foam substrate. Such substrates are well known in the art, and are typically formed of refractory ceramic or metallic materials.

Based on the prior art, the WC composition configuration of the present invention is not taught or recognized as having favorable performance or other beneficial features. In fact, the prior art specifically teaches against this configuration as outlined in detail in the Hu et al. patent and references therein.
Preparation:

The layered catalyst composite of the present invention may be readily prepared by processes known in the art. See, for example, U.S. Pat. No. 6,478,874 and EP0441173, which are herein incorporated by reference in their entirety. A representative process is set forth below. As used herein, the term "washcoat" has its usual meaning in the art of a thin, adherent coating of a catalytic or other material applied to a substrate material, such as a honeycomb-type substrate member, which is sufficiently porous to permit the passage there through of the gas stream being treated.

The catalyst composite can be readily prepared in layers on a monolithic substrate. For a first layer of a specific washcoat, finely divided particles of a high surface area refractory metal oxide such as gamma-alumina are slurried in an appropriate solvent, e.g., water. The substrate may then be dipped one or more times in such slurry or the slurry may be coated on the substrate such that there will be deposited on the substrate the desired loading of the metal oxide, e.g., about 0.5-4.0 $g/in^3$. To incorporate components such as precious metals (e.g., palladium, rhodium, platinum, and/or combinations of the same), stabilizers, binders, additives, and/or promoters, such components may be incorporated in the slurry as a mixture of water soluble or water-dispersible compounds or complexes. Thereafter the coated substrate is calcined by heating, e.g., at about 300-800° C. for about 1-3 hours. Typically, when palladium is desired, the palladium component is utilized in the form of a compound or complex to achieve high dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composite and is capable of being removed from the metal component by volatilization or decomposition upon heating and/or application of a vacuum. In some cases, the complete removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate. During the calcination step, or at least during the initial phase of use of the composite, such compounds are converted into a catalytically active form of the metal or a compound thereof.

Before describing several exemplary embodiments of the invention, it is to be understood that the invention is not limited to the details of construction or process steps set forth in the following description. The invention is capable of other embodiments and of being practiced in various ways.
Single Front Layer Embodiments According to some embodiments, the single front layer which is deposited upon, i.e., coated upon and adhered to, the substrate comprises palladium deposited on a support. A suitable support is a high surface area refractory metal oxide. In a specific embodiment, the loading of the first layer upon the substrate is between about 0.2-4.0 $g/in^3$. Examples of high surface area refractory metal oxides include, but are not limited to, alumina, silica, titania and zirconia and mixtures thereof. The refractory metal oxide may consist of or contain a mixed oxide such as silica-alumina, alumina-silicates which may be amorphous or crystalline, alumina-zirconia, alumina-lanthana, alumina-baria-lanthana-neodymia, alumina-chromia, alumina-baria, alumina-ceria, and the like. An exemplary refractory metal oxide comprises gamma-alumina having a specific surface area of about 50-350 $m^2/g$ and which is present in a loading of about 10-90% by weight of the washcoat. This layer typically will have oxygen storage components in the range of about 10-90% by weight with ceria content ranging form about 3-98% by weight of the layer material.

Examples of palladium loading in the front single layer include up to about 15% by weight, alternatively, between about 0.05-5% by weight of palladium, and between up to about 0.6% Rh by weight, alternatively between about 0.01-0.15% by weight Rhodium. This layer may also contain up to about 40% of stabilizers/promoters/binders/additives. Suitable stabilizers include one or more non-reducible metal oxides wherein the metal is selected from the group consisting of barium, calcium, magnesium, strontium, and mixtures thereof. In some embodiments, the stabilizer comprises one or more oxides of barium and/or strontium. Suitable promoters include one or more non-reducible oxides, or rare earth and transition metals selected from the group consisting of lanthanum, neodymium, praseodymium, yttrium, zirconium samarium, gadolinium, dysprosium, ytterbium, niobium, and mixtures thereof.

Rear 2-Layer Embodiments

Top or $2^{nd}$ catalytic layer of the 2-layer catalyst: The $2^{nd}$ catalytic layer, which is deposited upon, i.e., coated upon and adhered to, the first rear layer, comprises rhodium or rhodium and platinum deposited on a high surface area refractory metal oxide and/or oxygen storage component which may be any of those mentioned above with respect to the front 1-layer catalyst. The $2^{nd}$ catalytic layer will be present in a loading of about 1-2.5 g/in$^3$, alternatively, between about 1-1.6 g/in$^3$ and will have substantially an amount of oxygen storage components at a loading of about 10-90% by weight of the layer. Oxygen storage components can be ceria containing ceria/zirconia composite with ceria ranging from about 3-98% as weight percent. Preferably, about 5-55% of ceria is in the composite. The $2^{nd}$ catalytic layer also can comprise gamma-alumina or stabilized gamma-alumina having a specific surface area of about 50-350 m$^2$/g and which is present in a loading of about 10-90% by weight of the layer.

In some embodiments, rhodium and platinum will be present in the $2^{nd}$ catalytic layer in a loading of about 0.001-6.0% by weight, alternatively about 0.005-1.0% by weight of rhodium, and about 0.01-5.0% by weight, preferably about 0.1-1.0% by weight platinum. The $2^{nd}$ catalytic layer may also contain about 0-40% by weight of a promoter(s). Suitable promoters include one or more base metal oxides wherein the metal is selected from the group consisting of barium, calcium, magnesium, strontium, one or more rare earth and transition metals selected from the group consisting of zirconium, lanthanum, praseodymium, yttrium, samarium, gadolinium, dysprosium, ytterbium, niobium, neodymium, and mixtures thereof, $1^{st}$ Catalytic Layer Embodiments According to some embodiments, the first layer which is deposited upon, i.e., coated upon and adhered to, the substrate comprises palladium deposited on a support. A suitable support may be a high surface area refractory metal oxide. In a specific embodiment, the loading of the first layer upon the substrate is between about 0.2-2.8 g/in$^3$. Examples of high surface refractory metal oxides include, but are not limited to, a high surface area refractory metal oxide such as alumina, silica, titania and zirconia and mixtures thereof. The refractory metal oxide may consist of or comprise a mixed oxide such as silica-alumina, alumo-silicates which may be amorphous or crystalline, alumina-zirconia, alumina-lanthana, alumina-baria-lanthana-neodymia, alumina-chromia, alumina-baria, and the like. An exemplary refractory metal oxide comprises gamma-alumina having a specific surface area of about 50-350 m$^2$/g and which is present in a loading of about 10-90% by weight of the layer. The first layer which is applied in the rear zone is free of ceria-comprising oxygen storage materials.

Examples of palladium loading In the first layer include up to about 15% by weight, alternatively, between about 0.05-10% by weight of palladium. This layer may also contain up to about 40% by weight of stabilizers/promoters/binders/additives. Suitable stabilizers include one or more non-reducible metal oxides wherein the metal is selected from the group consisting of barium, calcium, magnesium, strontium, and mixtures thereof. In some embodiments, the stabilizer comprises one or more oxides of barium and/or strontium. Suitable promoters include one or more non-reducible oxides, or rare earth and transition metals selected from the group consisting of lanthanum, neodymium, praseodymium, yttrium, zirconium, samarium, gadolinium, dysprosium, ytterbium, niobium, and mixtures thereof.

The $1^{st}$ catalytic layer is deposited in exactly the same manner like the single front layer except for comprising substantially no OSC.

EXAMPLES

This invention will be illustrated by the following examples and descriptions. The following examples are intended to illustrate but not to limit the invention.

Figure 1A:
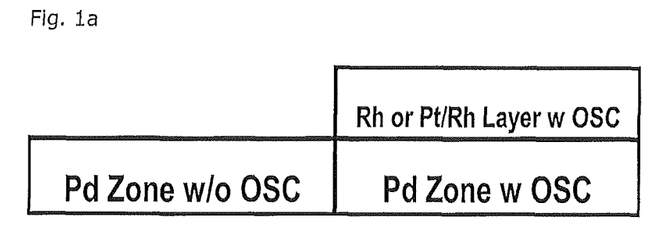
FIGS. 1a and 1b are examples of known washcoat layering and configurations.
Figure 1B:
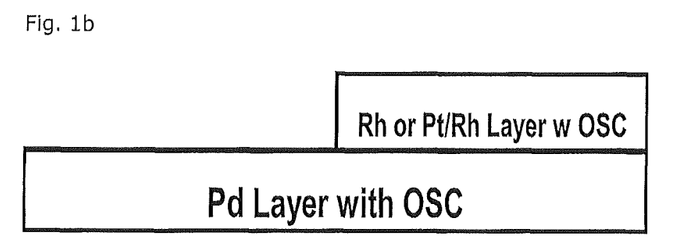
Figure 2:
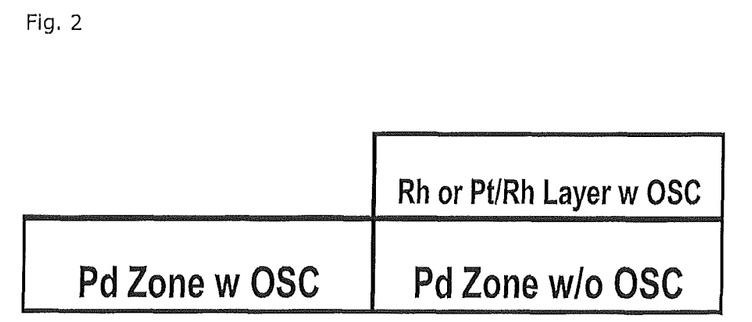
FIG. 2 are examples of washcoat layering and configuration of the present invention where the first layer of the rear zone or brick does not have OSC.

The WC composition configurations for a conventional reference catalyst (FIG. 1) and a catalyst according to the present invention (FIG. 2) were manufactured and compared as follows.

Manufacture of the Front 1-Layer Catalyst:

Preparation of the washcoats and coating has previously been described in U.S. Pat. No. 7,041,622, Column 9, Lines 20-40; Column 10, lines 1-15, which is herein incorporated by reference in its entirety. The 1-layer front catalyst or zone consists of two stabilized aluminas in a 1:1 ratio, one with 4% by weight of lanthanum oxide and the other 3% by weight lanthanum oxide; barium sulfate and a mixed oxide oxygen storage material with a composition of 50% $ZrO_2+HfO_2$, 40% $CeO_2$, 5% $Pr_6O_{11}$ and 5% $La_2O_3$. The slurry was prepared as follows. Nitric acid was added to water at 1 wt % based on the total solids in the slurry. $BaSO_4$ was then added with stirring followed by the OSC. The slurry was stirred for 15 minutes and then the aluminas were added slowly with stirring for 30 minutes. The slurry was then milled (using a Sweco type mill) such that the $d_{50}$ was 4.5-5.5 microns; the $d_{90}$ was 17-21 microns, and 100% pass was less than 65 microns (i.e., 100% of the particles had a size less than 65 micrometers). The slurry was then weighed and the LOI (loss on ignition) measured at 540° C. to determine the total calcined solids content. Based on this value the Pd and Rh weights were calculated. Rh was first added as Rh nitrate by slowly adding dropwise to the slurry over 30 minutes. Pd nitrate solution was then added to the slurry dropwise again over a period of 30 minutes while stirring. After the Rh and Pd addition the slurry specific gravity was in the range of 1.49 to 1.52. Parts were coated by dipping one end of a honeycomb ceramic monolith into the washcoat slurry, followed by drawing the slurry up into the channels using a vacuum. The part was then removed from the slurry and the channels cleared by applying a vacuum to the other end of the part. Washcoat loading was controlled by varying specific gravity, and other coating parameters such as vacuum time and the amount of slurry drawn into the honeycomb channels. After applying the washcoat, the parts were calcined at 540° C. for 2 hours.

After calcination the composition of the 1-layer front catalyst was as follows:

40 g/l of 4% Lanthanum-stabilized alumina;
40 g/l of 3% Lanthanum-stabilized alumina;
80 g/l oxygen storage material;

13 g/l Barium sulfate;
2 g/ft³ Rhodium; and
25 g/ft³ Palladium.

Manufacture of the 1$^{st}$ Catalytic Layer of the Rear Conventional Reference Catalyst:

The 1$^{st}$ catalytic layer or zone consisted of two stabilized aluminas in a 1:1 ratio, one with 4% by weight of lanthanum oxide and the other 3% by weight lanthanum oxide; barium sulfate and a mixed oxide oxygen storage material with a composition of 50% $ZrO_2$+$HfO_2$, 40% $CeO_2$, 5% $Pr_6O_{11}$ and 5% $La_2O_3$. The slurry preparation and coating were carried out as described above for the front 1-layer catalyst. After calcination at 540° C. for 2 hours the composition of the 1$^{st}$ catalytic layer was as follows:

25 g/l of 4% Lanthanum-stabilized alumina;
25 g/l of 3% Lanthanum-stabilized alumina;
50 g/l oxygen storage material;
8.0 g/l Barium sulfate; and
2 g/ft³ palladium.

Manufacture of the 2$^{nd}$ Catalytic Layer of the Rear Conventional Reference Catalyst:

The 2$_{nd}$ catalytic layer of the rear conventional catalyst consisted of two stabilized aluminas in a 1:2 ratio, one with 4% by weight of lanthanum oxide and the other 3% by weight lanthanum oxide; barium sulfate and a mixed oxide oxygen storage material with a composition of 58% $ZrO_2$+$HfO_2$, 32% $CeO_2$, 8% $Y_2O_3$ and 2% $La_2O_3$ by weight. The slurry preparation and coating were carried out as described above for the front 1-layer catalyst. After calcination at 540° C. for 2 hours the composition of the 2$^{nd}$ catalytic layer of the rear conventional catalyst was as follows:

30 g/l of 4% Lanthanum-stabilized alumina;
15 g/l of 3% Lanthanum-stabilized alumina;
68 g/l oxygen storage material;
8.5 g/l Barium sulfate; and
1.0 g/ft³ Rhodium.

Manufacture of the 2$^{nd}$ Catalytic Rear Layer of the Catalyst According to the Invention:

The composition and manufacture of the 2$^{nd}$ catalytic layer was identical with the conventional reference catalyst.

Manufacture of the Rear 1$^{st}$ Catalytic Layer of the Catalyst According to the Invention:

The composition of the rear 1$^{st}$ catalytic layer consisted of alumina stabilized with 3% by weight of lanthanum oxide and barium oxide. The slurry preparation and coating were carried out as described above for the front 1-layer catalyst. After calcination at 540° C. for 2 hours the composition of the 1$^{st}$ catalytic layer was as follows:

110.0 g/l Lanthanum-stabilized alumina;
10.0 g/l Barium oxide; and
2.0 g/ft³ Palladium.

Aging consisted of 50 or 100 hours of a 4-mode thermal aging protocol. The cycle consisted of four modes within a period of 60 seconds. The first mode consisted of a stoichiometric cruise, followed by a rich condition, a rich condition with secondary air injection and finally a stoichiometric condition with secondary air injection. Mode 1 lasted for 40 seconds with a catalyst inlet bed T (thermocouple placed 1" from the catalyst inlet face) of 904±2° C. Mode 2 lasted for 6 seconds with a catalysts inlet CO concentration at 4.0±0.1%. Mode 3 lasted for 10 seconds with a catalyst inlet bed T of 980° C.±2° C.; the engine out CO concentration was 4.0±0.1 vol % and a secondary air injection at the catalyst inlet was used to give an $O_2$ concentration of 2.5±0.1 vol %. Mode 4 lasted for 4 seconds with an engine out stoichiometric exhaust gas composition and secondary air injection to give an $O_2$ concentration of 4.5±0.1 vol % at the catalyst inlet The engine used for the aging was a 7.4 L V-8 equipped with sequential multi-port fuel injection.

Figure 3:
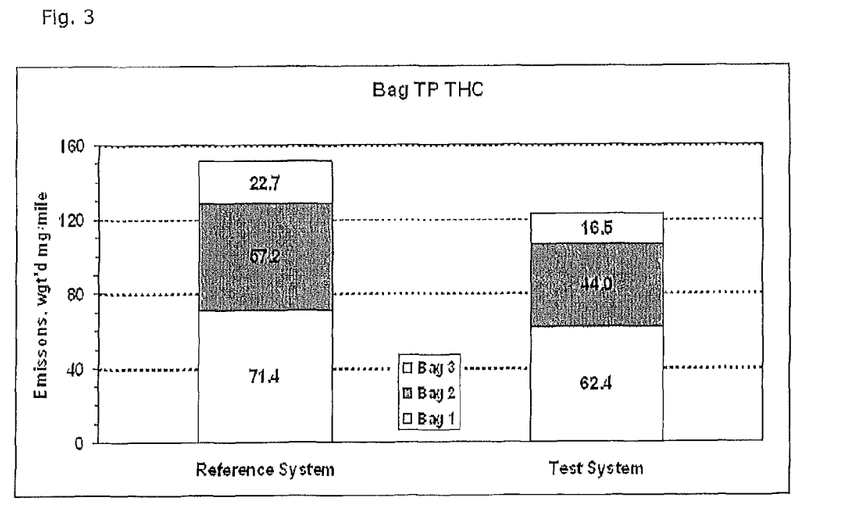
FIG. 3 is a comparison of the THC performance for a reference conventional catalyst configuration to a catalyst system made according to the current invention. Aging=50 Hrs of a thermal 4-Mode aging; Vehicle=2005 MY, BIN 5, 2.2 L/4 cylinder with sequential fuel injection. Front brick: 4.16" round×3" long; 600 cpsi/4.3 mill; Volume=40.8 in$^3$; Pd+Rh=27 g/ft$^3$ @ 0:12.5:1; Rear brick: 4.16" round×3" long; 400 cpsi/4 mill; Volume=40.8 in$^3$; Pd+Rh=3 g/ft$^3$ @ 0:2:1
Figure 4:
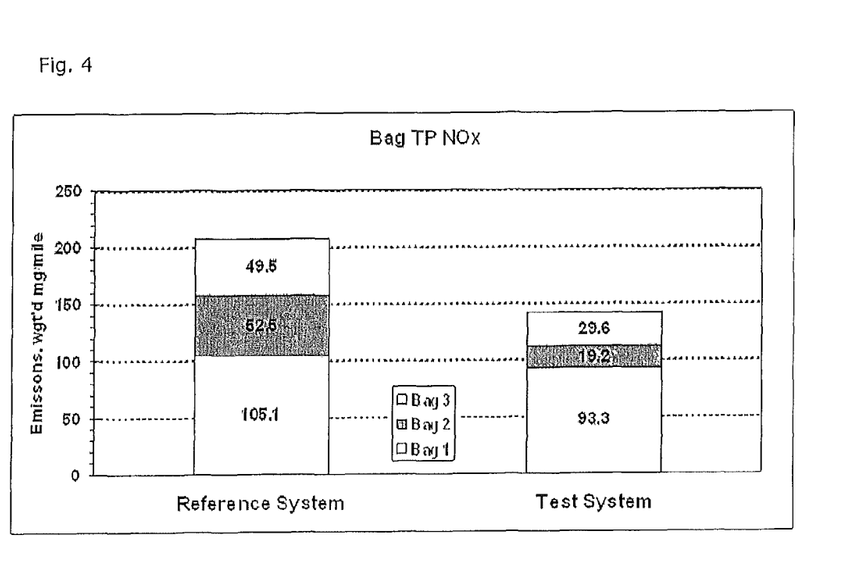
FIG. 4 is a comparison of the NOx performance for a reference conventional catalyst configuration to a catalyst system made according to the current invention. Aging=50 Hrs of a thermal 4-Mode aging; Vehicle=2005 MY, BIN 5, 2.2 L/4 cylinder with sequential fuel injection. Front brick: 4.16" round×3" long; 600 cpsi/4.3 mill; Volume=40.8 in$^3$; Pd+Rh=27 g/ft$^3$ @ 0:12.5:1; Rear brick: 4.16" round×3" long; 400 cpsi/4 mill; Volume=40.8 in$^3$; Pd+Rh=3 g/ft$^3$ @ 0:2:1.

The performance results are summarized in FIGS. 3 and 4 where it is seen that the catalyst design of the current invention shows clear advantages for THC and NOx in Phases 2 and 3 of the FTP test.

To the extent necessary to understand or complete the disclosure of the present invention, all publications, and patent applications mentioned herein are expressly incorporated by reference therein to the same extent as though each were individually so incorporated.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A catalyst composite for the purification of exhaust gases of a combustion engine substantially running under stoichiometric conditions comprising in sequence and in order:
   a front single catalytic layer on a substrate; and
   a rear double catalytic layer on a substrate having a 1$^{st}$ (lower) catalytic layer and a 2$^{nd}$ (upper) catalytic layer;
   wherein the 2$^{nd}$ catalytic layer comprises rhodium as a PGM;
   wherein the front single catalytic layer and the 1$^{st}$ catalytic layer comprise palladium as a PGM compound;
   wherein the 1$^{st}$ catalytic layer is substantially free of an oxygen storage component (OSC); and
   wherein the front single catalytic layer forms a front zone and the rear double catalytic layer forms a rear zone where the catalyst composite is a single-brick system or the front single catalytic layer is located in a front brick and the rear double catalytic layer is located in a rear brick where the catalyst composite is a multi-brick system.

2. The catalyst composite according to claim 1, wherein the 1$^{st}$ catalytic layer comprises less than 1% of an oxygen storage component (OSC) by weight of the layer.

3. The catalyst composite according to claim 1, wherein the PGM content of the layers are as follows:
   front single catalytic layer—0.01-12.0% by weight of the layer;
   1$^{st}$ catalytic layer—0.05-6.0% by weight of the layer; and
   2$^{nd}$ catalytic layer—0.01-2% by weight of the layer.

4. The catalyst composite according to claim 3, wherein the front single catalytic layer and the 1$^{st}$ catalytic layer comprise palladium as a PGM only.

5. The catalyst composite according to claim 1, wherein the 2$^{nd}$ catalytic layer comprises platinum as a PGM.

6. The catalyst composite according to claim 5, wherein the platinum content in the layers is as follows:
   front single catalytic layer—0.05-12.0% by weight of the layer; and
   2$^{nd}$ catalytic layer—0.01-5.0% by weight of the layer.

7. The catalyst composite according to claim 1, wherein the content of oxygen storage component (OSC) by weight of the layers are as follows:
   single front catalytic layer—10-80% by weight of the layer; and
   2$^{nd}$ catalytic layer—10-80% by weight of the layer.

8. The catalyst composite according to claim 1, further comprising exhaust treatment materials selected from the group consisting of hydrocarbon storage and NOx storage catalysts, with the hydrocarbon storage and/or NOx storage catalyst as an undercoat WC layer on the substrate to form the front zone or front brick and/or the rear zone or rear brick.

9. The catalyst composite according to claim 1, further comprising exhaust treatment materials selected from the group consisting of hydrocarbon storage and NOx storage catalysts, with the hydrocarbon storage and/or NOx storage catalyst as a top or overcoat WC layer to form the front zone or front brick and/or the rear zone or rear brick.

10. The catalyst composite according to claim 1, wherein the catalyst composite is at least partially deposited on an undercoat layer (UC) comprising material selected from the group consisting of hydrocarbon storage material or NOx storage material.

11. The catalyst composite according to claim 1, wherein the catalyst composite comprises an inlet axial end, an outlet axial end, wall elements having a length extending between the inlet axial end to the outlet axial end and a plurality of axially enclosed channels defined by the wall elements; and wherein
the front single catalytic layer is deposited on the wall elements adjacent the inlet axial end and having a length extending less than the wall length of the wall elements to form the front zone; and
the $1^{st}$ and $2^{nd}$ catalytic layers of the rear double catalytic layer are deposited on the wall elements adjacent to the outlet axial end and having a length extending for less than the length of the wall elements to form the rear zone.

12. The catalyst composite according to claim 1, wherein the front single layer is deposited on the inlet channels of a wall flow filter to form the front zone and the $1^{st}$ and $2^{nd}$ catalytic layers are deposited on the inlet and/or outlet channels of the wall flow filter to form the rear zone.

13. An exhaust treatment system for the purification of exhaust gases of a combustion engine substantially running under stoichiometric conditions comprising a catalyst composite according to claim 1.

14. The exhaust treatment system according to claim 13, further comprising one or more exhaust treatment devices selected from a gasoline particulate filter, an NOx storage device, and a hydrocarbon storage device.

15. A method for treating the exhaust gases of a combustion engine substantially running under stoichiometric conditions, wherein the method comprises:
contacting a gaseous stream comprising hydrocarbons, carbon monoxide, and nitrogen oxides with a catalyst composite of claim 1, wherein the catalytic composite is effective to substantially simultaneously oxidize the carbon monoxide and the hydrocarbons and reduce the nitrogen oxides.

* * * * *